W. J. DAVIS, Jr. & A. P. NIRDLINGER.

ADJUSTABLE FLOOD AND SPOT LIGHT.

APPLICATION FILED NOV. 29, 1915.

Reissued Jan. 29, 1918.

14,428.

3 SHEETS—SHEET 1.

Witness:
C. C. Burnap

Inventors:
William J. Davis Jr.
Albert P. Nirdlinger
By Sheridan, Wilkinson & Scott, Atty's W. J. DAVIS, Jr. & A. P. NIRDLINGER.

ADJUSTABLE FLOOD AND SPOT LIGHT.

APPLICATION FILED NOV. 29, 1915.

Reissued Jan. 29, 1918.

14,428.

3 SHEETS—SHEET 2.

Witness:
C. C. Burnap

Inventors:
William J. Davis Jr.
Albert P. Nirdlinger
By
Sheridan, Wilkinson & Scott, Attys W. J. DAVIS, Jr. & A. P. NIRDLINGER.

ADJUSTABLE FLOOD AND SPOT LIGHT.

APPLICATION FILED NOV. 29, 1915.

Reissued Jan. 29, 1918. 14,428.

3 SHEETS—SHEET 3.

Witness:

C. E. Durnap

Inventors:

William J. Davis Jr.

Albert P. Nirdlinger

By Sheridan, Wilkinson & Scott, Atty's

UNITED STATES PATENT OFFICE.

WILLIAM J. DAVIS, JR., AND ALBERT P. NIRDLINGER, OF CHICAGO, ILLINOIS.

ADJUSTABLE FLOOD AND SPOT LIGHT.

14,428. Specification of Reissued Letters Patent. Reissued Jan. 29, 1918.

Original No. 1,140,880, dated May 25, 1915, Serial No. 869,901, filed November 2, 1914. Application for reissue filed November 29, 1915. Serial No. 64,198.

*To all whom it may concern:*

Be it known that we, WILLIAM J. DAVIS, Jr., a citizen of the United States, residing at Chicago, in the county of Cook and State of Illinois, and ALBERT P. NIRDLINGER, a citizen of the United States, residing at Chicago, in the county of Cook and State of Illinois, have invented certain new and useful Improvements in Adjustable Flood and Spot Lights, of which the following is a specification.

This invention relates to improvements in lighting apparatus, and the objects of the invention are to dispose a source of light—which in the present instance consists preferably of a nitrogen-filled incandescent lamp—in the path of a relatively adjustable reflector, so as to secure a comparatively efficient degree of concentration and projection of the rays; to provide improved means for mounting and adjusting the lamp and the reflector; to ventilate the apparatus so employed; to provide means for modifying the light so reflected by the interposition of various colored screens or transparencies in the path of the rays; to provide means for revolving and tilting the apparatus to the desired focus and position; and to provide such other features of construction and arrangement as may be necessary, as will appear more clearly from the following specification, taken in connection with the accompanying drawings, in which—

Like numerals refer to similar parts throughout the several views of the drawings.

Figure 1:
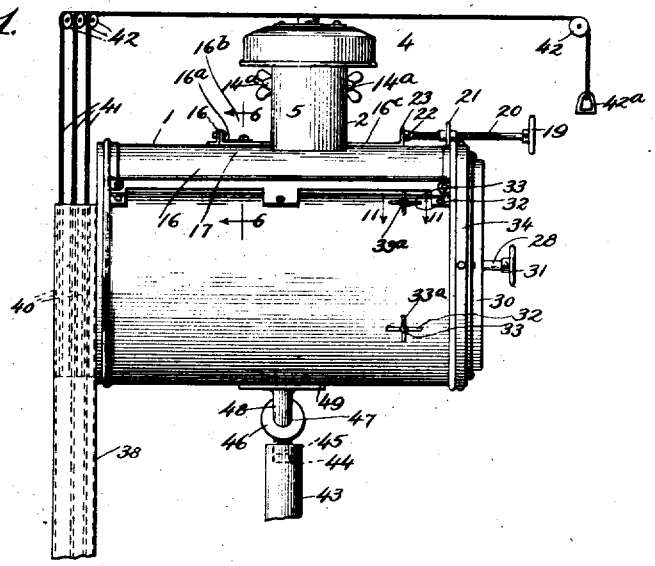
Figure 1 is a side elevation of the lantern resting on a pedestal or support.
Figure 2:
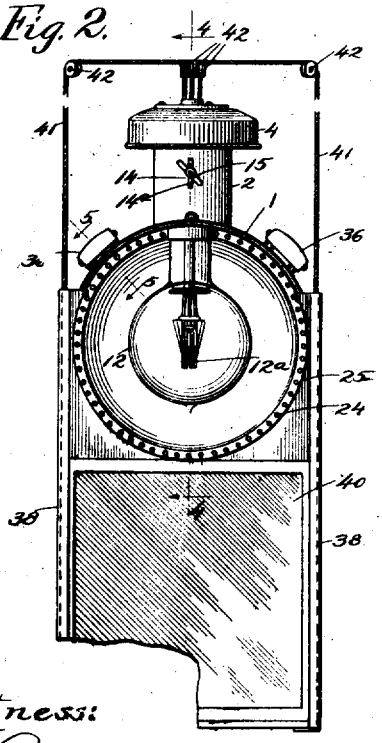
Fig. 2 is a front elevation of the same.
Figure 3:
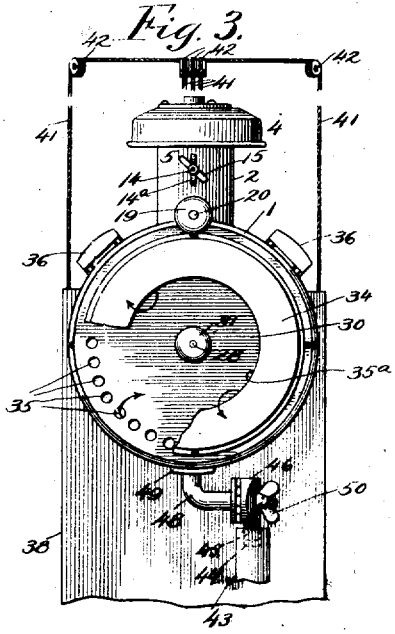
Fig. 3 is a rear elevation with a part of the outer end wall or closure broken away.
Figure 4:
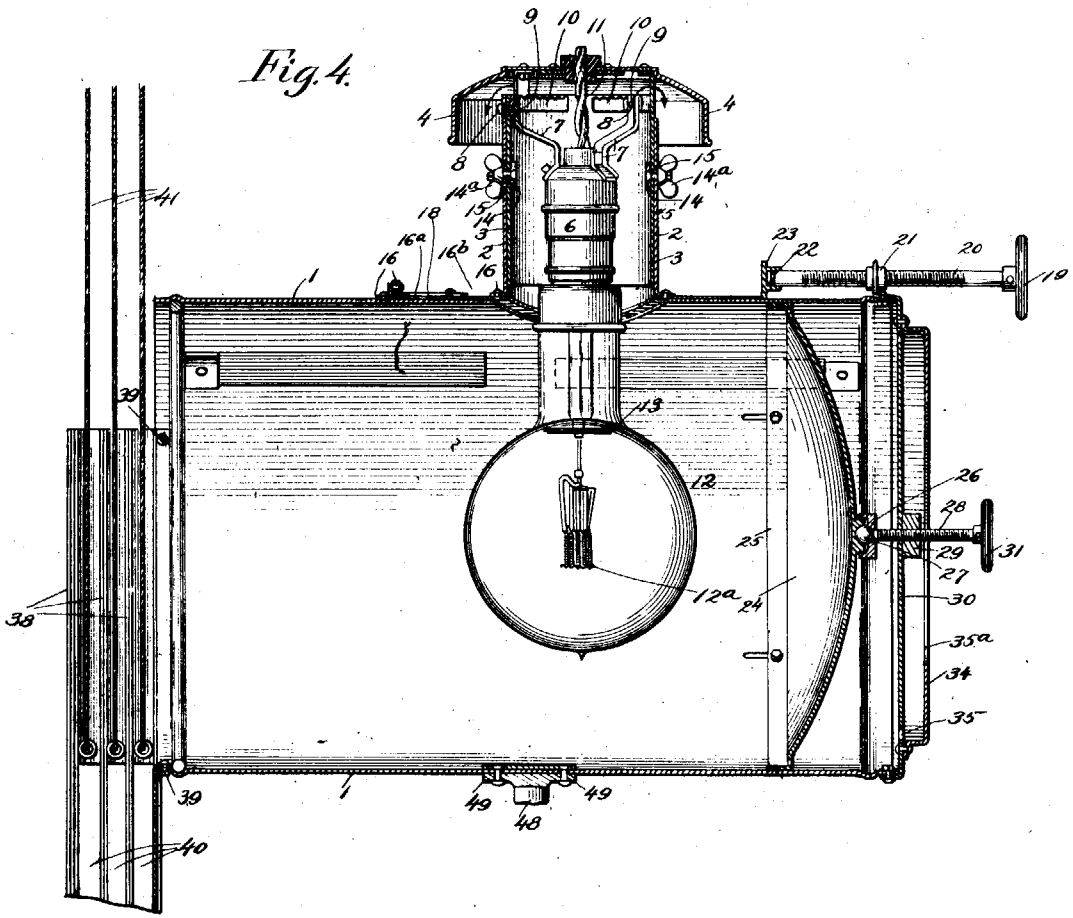
Fig. 4 is a section on the line 4—4 of Fig. 2.
Figure 5:
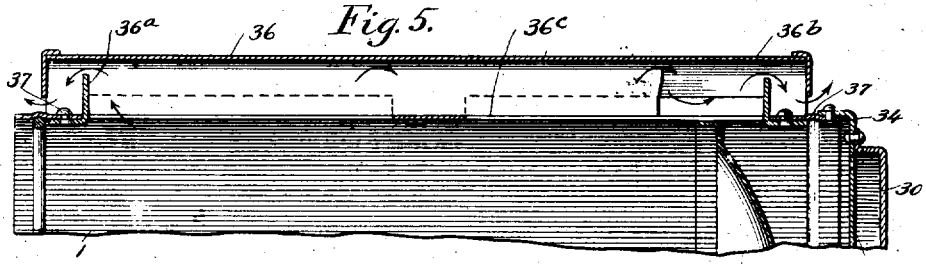
Fig. 5 is a section on the line 5—5 of Fig. 2.
Figure 6:
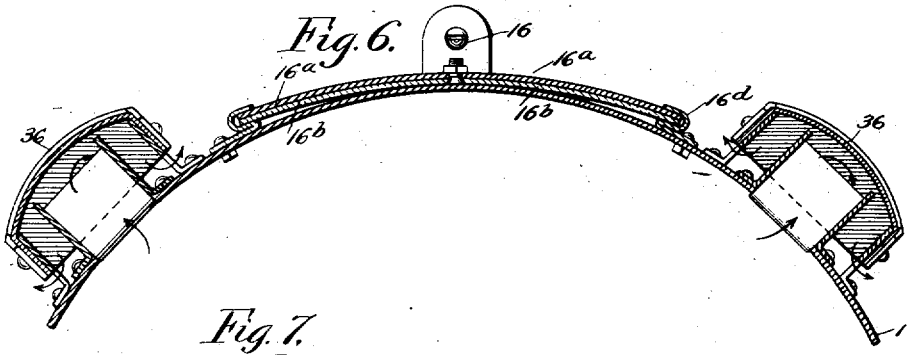
Fig. 6 is a cross section on the line 6—6 of Fig. 1.
Figure 7:
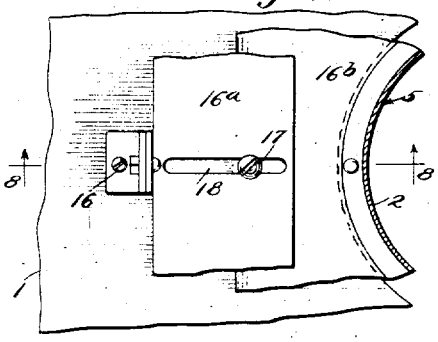
Fig. 7 is an enlarged plan view of the means for mounting the chimney on the shell.
Figure 8:
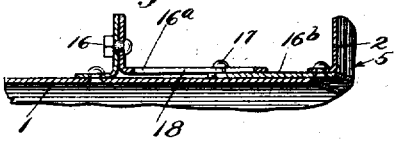
Fig. 8 is a sectional view on the line 8—8 of Fig. 7.
Figure 11:
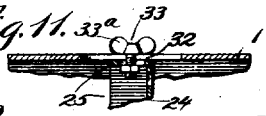
Fig. 11 is an enlarged section on the line 11—11 of Fig. 1, showing the means for guiding and adjusting the peripheral rim of the reflector.
Figure 10:
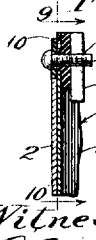
Fig. 10 is a sectional view on the line 10—10 of Fig. 9.
Figure 9:
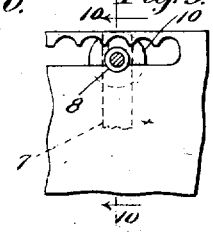
Fig. 9 is an enlarged sectional detail on the line 9—9 of Fig. 10, showing the means for adjusting the lamp brackets with respect to the movable sleeve.
Figure 12:
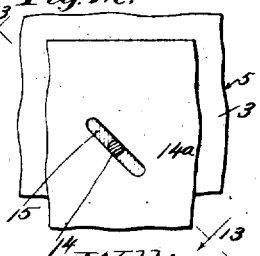
Fig. 12 is an enlarged elevation showing the means for connecting the inner and outer sleeves of the chimney to permit relative adjustment thereof.
Figure 13:
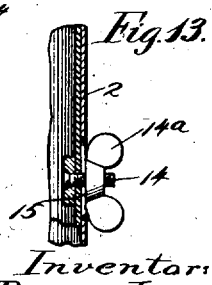
Fig. 13 is an enlarged sectional view, taken on the line 13—13 of Fig. 12.

Referring to the drawings, the focal lantern shell or casing 1 of the mechanism we preferably make of metal suitably finished to stand the comparatively great heat engendered in the use of the lamp. This shell is provided with an upwardly projecting sleeve 2, and telescoping into this sleeve is the movable sleeve 3, which is provided with the hood 4 spaced therefrom, and which members 2, 3, and 4 form the chimney 5, which is adapted to ventilate the apparatus, as shown by the course of the arrows under said hood. The ordinary contact socket 6 is adjustably connected to the sleeve 3 by means of brackets 7, 7, which are rigidly fixed to the socket 6 and are operatively connected with the sleeve 3, by means of the screws 8, 8, which register with the threaded apertures 9, 9, provided in the brackets and operatively reciprocate in the meshed or notched slots 10, 10 provided in the sleeve 3 so as to permit the rotation and centering adjustment of the socket 6. The series of meshes forming the upper line of the slots 10 are adapted to permit the raising of the brackets 7 by loosening the screws 8 at whatever point in the slots the brackets should require to be secured. The wires 11 pass from the contact elements in the socket 6 through the roof of the hood 4, being suitably insulated therefrom. The lamp 12 screws in the ordinary way to the contact in the socket 6. A mica washer 13 is interposed above the filament $12^a$, which forms the incandescent crater of the lamp and the contact from the heat of the lamp, and to aid in maintaining a circulation of the gas in the lamp bulb in case a gas-filling lamp is used.

The sleeve 2 is provided with threaded lugs 14 which project outwardly through the inclined slots 15 provided in the sleeve 3, and are secured by the thumb screws 14ᵃ. By virtue of these slots and lugs, the manipulation of the sleeve by the grasp of the operator on the hood 4 imparts a combined rotary and longitudinal movement to the sleeve 3, which carries the socket 6 and the lamp 12, attached as above described.

The chimney 5 is movably connected with the shell 1 by means of the screws and lugs 16 and a number of operatively overlapping plates 16ᵃ and 16ᵇ, which engage the guides 16ᵈ secured to the shell, and which are operatively connected by means of the lugs 17 reciprocating in the slots 18. The chimney and plates are manipulated by means of the wheel 19 fixed on the threaded rod 20, which engages the threads provided in the aperture of the lug 21 rigidly fixed to the shell 1; this rod being provided with a collar 22 which is operatively connected with the socket 23 rigidly fixed to the plate 16ᵉ, which, in turn, is secured to the sleeve 2. The rod 20 forms a groove and pin joint, or swivel connection with the socket 23, so that the turning of said rod imparts a longitudinal movement to the chimney 5 and the lamp 12 thereto attached, as above described.

From the foregoing it will be seen that there are several different adjustments of the lamp and chimney, namely, the adjustment of the brackets 7 with respect to the sleeve 3 by means of the screws 8 operating in the racks 10, the combined relative rotating and longitudinal movement of the sleeve 3 with respect to the sleeve 2 by virtue of the lugs 14 and slots 15, and the longitudinal movement of the chimney with respect to the shell by means of the hand wheel 19 and coöperating parts. By means of these several adjustments the lamp 12 may be suitably adjusted to the desired position before the reflector 24.

The peripheral rim 25 of the reflector 24 snugly fills the barrel of the shell 1. On the back of the reflector is provided a socket member 26, which is adapted to receive and form a swivel connection with the ball 27 forming the end of the threaded rod 28, which passes through the threaded aperture 29 provided in the inner end wall or closure 30 of the shell 1, and which rod is provided with the hand wheel 31. When this hand wheel is manipulated by the operator to effect the turning of the rod 28, the reflector will be moved in the direction of its axis longitudinally in the barrel of the shell within the limits of the slots 32, of suitable length, which are provided in the shell and which are adapted to receive the threaded lugs 33, rigidly fixed to the rim 25 of the reflector, and engaged at their outer ends by the nuts 33ᵃ.

Behind the reflector 24 the inner wall or closure 30 of the shell 1 is provided adjacent its edge with a plurality of perforations 35, and the outer wall 34 is provided with the vent 35ᵃ for ventilating the shell. The rod 28 extends through the vent 35ᵃ. Further ventilation is provided by the ventilators 36, which are attached longitudinally along the shell 1 by means of the fastenings 37, the ventilation occurring as indicated by the course and direction of the arrows. These ventilators consist of radially directed duct members 36ᵃ which are covered over by hoods 36ᵇ, whose walls are spaced from the corresponding walls of the duct member to leave spaces for ventilation, as shown, while preventing the entrance of dirt and moisture. The casing 1 is provided with longitudinal slots 36ᶜ which communicate with the duct members. The duct members and the hoods are attached to the casing, as shown.

A series of metallic guides 38 is attached to the muzzle of the shell 1 by means of the fastenings 39, and these guides are adapted to receive various screens 40, which are raised by means of the lines 41, pulleys 42, and buttons or handles 42ᵃ, being raised by the pull of the operator and lowered by gravity. The apparatus as a whole is mounted upon the pedestal 43, which is provided with a socket 44 adapted to receive the horizontally revolving plug 45. The upper stock 46 of the plug is expanded and is provided with an aperture 47, which is adapted to receive the goose neck 48, which is rigidly fixed to the shell by means of the fastenings 49 and which is adapted to rotate in a vertical plane in said aperture 47, and is regulated and secured at the will of the operator by means of the thumb-screw 50.

In order that the reflector 24 may be adjusted to the desired radial focus or posture, any one or more of the series of screws 33ᵃ may be tightened or loosened to advance or retard the movement of the corresponding segment of the reflector when the same shall be moved by means of the threaded rod by the turning of the handle 31.

The adjustment of the brackets 7 in the meshed slots 10 is intended primarily for roughly centering the fixture 6 and lamp 12, so that the crater 12ᵃ of the lamp initially will be as near as may be in the path of the focal center of the reflector when the lamp is first suspended in said chimney. After the crater shall be lighted and the focal aperture directed, by means of the goose neck and swivel to the desired object, the operator, to obtain a more exact adjustment of the lighted crater to the focal center of the reflector, seizes the rim of the hood 4 and the wheel 31, and reciprocally manipulates the same in manner and for the purposes described.

It will be understood that our invention is not limited to the form herein described for purposes of illustration, and that it may be altered in construction and arrangement without departing from the scope thereof as defined by the appended claims.

We claim:—

1. In apparatus of the class described, a casing having an opening at one end, an adjustable reflector mounted in said casing and directed toward said opening, said opening being as large in size as said reflector, said casing having an aperture in a wall thereof, an incandescent lamp supported entirely in the aperture in said wall and projecting transversely to the axis of said reflector, and means operable from the outside of said casing for adjusting said lamp with respect to the walls of said aperture.

2. In apparatus of the class described, a casing open at one end, a support upon which said casing is adjustably mounted, a reflector mounted in said casing and directed toward the open end thereof, a chimney mounted on the top of said casing, an incandescent lamp located in said casing, means mounted in said chimney for supporting said lamp with its filament located on the focal axis of said reflector, said reflector being relatively flat and said lamp being entirely in front of said reflector, and means operable from the outside of said chimney for adjusting said lamp longitudinally of said focal axis.

3. In apparatus of the class described, a casing open at one end, a reflector mounted in said casing and directed toward said opening, said casing having an aperture in the upper side thereof, a chimney mounted over said aperture, supporting means mounted in said chimney, a lamp carried by said supporting means and carrying a part extending through said aperture with the light-emitting means thereof located on the focal axis of said reflector, and means operatively connected with said supporting means for sliding said supporting means parallel to said focal axis.

4. In apparatus of the class described, a casing open at one end and having an aperture in the upper side thereof, a reflector mounted in said casing and directed toward the open end thereof, a chimney mounted on top of said casing over said aperture, an incandescent lamp extending transversely to the focal axis of said reflector within said casing with its filament located on said focal axis, means extending between the walls of said chimney for supporting said lamp, said lamp being located entirely in front of said reflector, and means operable from the outside of said casing for adjusting said lamp bodily parallel to said focal axis.

5. In apparatus of the class described, an apertured casing, a chimney surrounding the aperture of the casing, a lamp supported by the chimney and projecting into the casing, a reflector mounted in said casing, and means for adjusting said chimney with respect to said casing.

6. In apparatus of the class described, a casing having an aperture in one end thereof, a standard upon which said casing is adjustably mounted, a reflector of substantially the same size as said casing mounted therein and directed toward said aperture, an incandescent lamp supported on the wall of said casing and extending transversely to the focal axis of said reflector entirely in front of the same, means for adjusting said lamp transversely to and parallel with the focal axis of said reflector, means for ventilating said casing, and a non-refracting closure for the aperture in said casing.

7. In apparatus of the class described, an apertured casing, a lamp projecting through the aperture in the casing, a reflector mounted in the casing, and means to permit rotation of said lamp about an axis transverse to the axis of said reflector and for automatically effecting a longitudinal movement of said lamp during said rotation.

8. In apparatus of the class described, a casing having an opening at one end, a reflector mounted in said casing and directed toward said opening, a supplementary casing mounted on one wall of said casing, a lamp supported entirely by said supplementary casing and projecting into said first-mentioned casing transversely to the focal axis of said reflector, and means operable from the outside of both of said casings during the operation of said lamp for sliding said lamp longitudinally of and parallel to said focal axis.

9. In apparatus of the class described, a casing having an opening at one end, a reflector mounted in said casing and directed toward said opening, a lamp located in said opening in front of said reflector transversely to the focal axis thereof with the light-emitting means located on said axis, said casing having an aperture in the wall thereof, a supplementary casing mounted over said aperture, supporting means connected to said lamp and mounted in said supplementary casing, and means for sliding said lamp support parallel to said focal axis.

10. In apparatus of the class described, a casing, a reflector mounted in said casing, a lamp mounted in said casing in front of said reflector, means operable from the outside of said casing for adjusting said reflector longitudinally of its axis with respect to said lamp, and means for adjustably securing said reflector to said casing at different points around its periphery.

11. In apparatus of the class described, a cylindrical casing having an aperture at one end, a reflector mounted in said casing, means coacting with said casing and operable from the outside thereof for reciprocating said reflector therein, and means coacting with the rim of said reflector for adjustably securing the same to said casing.

12. In apparatus of the class described, a cylindrical casing having an aperture at one end, a reflector mounted in said casing, means coacting with said casing for reciprocating said reflector therein, said casing having longitudinal slots therein adjacent said reflectors, lugs carried by said reflector and projecting through said slots, and clamping means engaging said lugs.

13. In apparatus of the class described, an apertured casing, a reflector in said casing, a chimney over the aperture in said casing, said chimney comprising means for supporting a lamp in said casing, plates carried by said chimney and adjustably connected to said casing, and means connected to said casing and coacting with one of said plates for moving said chimney with respect to said casing.

14. In apparatus of the class described, a casing, a reflector mounted therein, said casing having an opening therethrough in front of said reflector, a chimney over said opening, said chimney comprising two telescoping sleeves, means for connecting one of said sleeves to said casing, and means carried by the other sleeve for supporting a lamp.

15. In apparatus of the class described, a casing, a reflector mounted therein, said casing having an opening therethrough in front of said reflector, a chimney over said opening, said chimney comprising two telescoping sleeves, means for connecting one of said sleeves to said casing, and means carried by the other sleeve for supporting a lamp, said means being adjustable with respect to said sleeve for varying the position of said lamp with respect to said sleeve.

16. In apparatus of the class described, a casing, a reflector mounted therein, said casing having an opening therethrough in front of said reflector, a chimney over said opening, said chimney comprising two telescoping sleeves, means for connecting one of said sleeves to said casing, means carried by the other sleeve for supporting a lamp, said sleeves being relatively rotatable, one of said sleeves having inclined slots therethrough, and lugs carried by the other sleeve and projecting through said slots, whereby relative rotation of said sleeves causes movement of said lamp-supporting means in the direction of the axis of said chimney.

17. In apparatus of the class described, a casing, a reflector mounted therein, said casing having an opening therethrough in front of said reflector, a chimney over said opening, said chimney comprising two telescoping sleeves, means for connecting one of said sleeves to said casing, means carried by the other sleeve for supporting a lamp, and a hood carried by the said last-named sleeve and spaced upwardly therefrom, whereby ventilating spaces are provided.

18. In apparatus of the class described, a cylindrical casing having a focal aperture at one end and a closure at the other, a reflector mounted in said casing and directed toward said focal aperture, a lamp mounted in said casing in front of said reflector, said closure having a plurality of apertures therethrough, and an outer wall disposed opposite said apertures and having a vent therethrough.

19. In apparatus of the class described, a casing having an opening in one end thereof, a reflector mounted in said casing and directed toward said opening, said casing having an aperture in the upper wall thereof, a chimney mounted over said aperture, supporting means mounted in said chimney, a lamp carried by said supporting means and extending downwardly into said casing transversely to the focal axis of said reflector, a hood mounted over the upper end of said chimney and spaced therefrom, and means for adjusting said lamp longitudinally of the focal axis of said reflector.

20. In apparatus of the class described, the combination of a ventilated casing having a focal aperture in one end thereof and a closure in the other end, an adjustable ventilated chimney operatively secured to said casing, a lamp carried by said chimney and projecting into said casing, a reflector mounted between said lamp and closure and directed toward said focal aperture, said reflector being adapted to reflect the rays from said lamp and project the same through the focal aperture of said casing, means for centering and adjusting said lamp, and means for operating said chimney.

21. In apparatus of the class described, a casing having a focal aperture, a reflector mounted in said casing and directed toward said focal aperture, a lamp mounted in said casing in front of said reflector, and means controlled from the outside of said casing when said apparatus is in operation for independently adjusting said lamp transversely to and substantially parallel to the focal axis of said reflector while preventing irregular movement of said lamp.

22. In apparatus of the class described, a casing open at one end, a reflector mounted in said casing and directed toward said opening, said casing having an aperture through a lateral wall thereof, an incandescent lamp mounted in said casing in front of said reflector and carrying a part extending through said aperture, supporting means mounted over said aperture and connected to said part of said lamp, said supporting means being slidably mounted with respect to said casing to permit movement of said lamp longitudinally of the focal axis of said reflector, and means comprising an operating screw for moving said supporting means to adjust the position of said lamp.

23. In apparatus of the class described, a casing open at one end, a reflector mounted in said casing and directed toward said opening, said casing having an aperture through the upper wall thereof, a chimney mounted over said aperture, a lamp located with its filament on the focal axis of said reflector and extending into said chimney, means connected to the wall of said chimney for supporting said lamp, and a rotatable element mounted in said chimney for moving said lamp transversely to said focal axis.

24. In apparatus of the class described, a casing having an opening at one end, a reflector of substantially the same size as said casing mounted therein and directed toward said opening, said casing having a relatively large aperture in the upper wall thereof, an incandescent lamp having its filament on the focal axis of said reflector and having a part of less thickness than said aperture extending upwardly therethrough, supporting means connected to said part of said lamp and slidably mounted with respect to said casing to move parallel to said focal axis, a closure mounted above said aperture, and operating mechanism mounted above said casing for sliding said lamp supporting means.

In testimony whereof we have subscribed our names.

WILLIAM J. DAVIS, Jr.
ALBERT P. NIRDLINGER.